(12) United States Patent
Vallapureddy et al.

(10) Patent No.: US 11,748,381 B2
(45) Date of Patent: Sep. 5, 2023

(54) DATA EXTRACTION FROM A MULTIDIMENSIONAL DATA STRUCTURE

(71) Applicant: Capital One Services, LLC, McLean, VA (US)

(72) Inventors: Anil Kumar Vallapureddy, Glenn Allen, VA (US); Richard Everson, Mechanicsville, VA (US); Seshikanth Bandlapalli, Glen Allen, VA (US); Michael Baker, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 85 days.

(21) Appl. No.: 17/305,833

(22) Filed: Jul. 15, 2021

(65) Prior Publication Data

US 2023/0017095 A1   Jan. 19, 2023

(51) Int. Cl.
    *G06F 16/215*    (2019.01)
    *G06F 16/2455*   (2019.01)
    *G06F 16/248*    (2019.01)
    *G06F 16/28*     (2019.01)

(52) U.S. Cl.
    CPC .......... *G06F 16/283* (2019.01); *G06F 16/215* (2019.01); *G06F 16/248* (2019.01); *G06F 16/24564* (2019.01); *G06F 16/24568* (2019.01); *G06F 16/287* (2019.01)

(58) Field of Classification Search
    CPC ................. G06F 16/283; G06F 16/215; G06F 16/24564; G06F 16/24568; G06F 16/248; G06F 16/287
    See application file for complete search history.

(56) References Cited

U.S. PATENT DOCUMENTS

| | | | |
|---|---|---|---|
| 6,412,054 B1 * | 6/2002 | Bhatia | G06F 3/0611 |
| | | | 711/170 |
| 10,635,062 B2 * | 4/2020 | Beyer | G06F 16/2474 |
| 2017/0103111 A1 * | 4/2017 | Lavin | G06F 16/9535 |
| 2021/0248121 A1 * | 8/2021 | Allgeier | G06F 16/2264 |
| 2021/0397591 A1 * | 12/2021 | Camper | G06F 16/285 |

(Continued)

OTHER PUBLICATIONS

Saccà et al., Count Constraints and the Inverse OLAP Problem: Definition, Complexity, and a Step toward Aggregate Data Exchange, 2012, Springer-Verlag Berlin Heidelberg, pp. 363-380 (Year: 2012).*

(Continued)

*Primary Examiner* — Jorge A Casanova
(74) *Attorney, Agent, or Firm* — Harrity & Harrity, LLP (57) ABSTRACT

In some implementations, a device may identify respective sets of unique values for multiple dimensions of a multidimensional data structure. The device may identify a plurality of subsets of permutations of a set of permutations of the unique values. The plurality of subsets of permutations are to be processed in parallel. The device may obtain, based on processing the plurality of subsets of permutations in parallel, respective data associated with each permutation of the plurality of subsets of permutations. The data for a permutation, of the plurality of subsets of permutations, is obtained based on respective unique values for the permutation that are determined independently of another permutation of the plurality of subsets of permutations.

20 Claims, 7 Drawing Sheets

(56) References Cited

U.S. PATENT DOCUMENTS

2022/0198066 A1* 6/2022 Lampe .................. G06F 21/72
2022/0358128 A1* 11/2022 Allahverdiyev .... G06F 16/9035

OTHER PUBLICATIONS

Sarawagi, Indexing OLAP Data, 1997, Bulleting of the IEEE Computer Society Technical Committee on Data Engineering, pp. 36-43 (Year: 1997).*

Sathe et al., Intelligent Rollups in Multi-dimensional OLAP Data, 2001, Proceedings of the 27th, VLDB Conference, pp. 1-10 (Year: 2001).*

* cited by examiner

DATA EXTRACTION FROM A MULTIDIMENSIONAL DATA STRUCTURE

BACKGROUND

Online analytical processing (OLAP) is a computer-based technique of analyzing data. In particular, OLAP is an approach for analyzing a multidimensional dataset (e.g., an OLAP cube), and for responding to multidimensional analytical queries, in an efficient manner. Applications of OLAP include business reporting for sales, marketing, management reporting, business process management, budgeting and forecasting, financial reporting, or the like.

SUMMARY

In some implementations, a system for data extraction includes one or more memories, and one or more processors communicatively coupled to the one or more memories. The one or more processors may be configured to: identify respective sets of unique values for multiple dimensions of a multidimensional data structure; identify a plurality of subsets of permutations of a set of permutations of the unique values, wherein the plurality of subsets of permutations are to be processed in parallel; obtain, based on processing the plurality of subsets of permutations in parallel, respective data associated with each permutation of the plurality of subsets of permutations, wherein data for a permutation, of the plurality of subsets of permutations, is obtained by performing, for each dimension of the multiple dimensions, a modulo operation on an index of the permutation and a quantity of unique values in a set of unique values for the dimension to obtain respective unique values in the multiple dimensions associated with the permutation; and store the respective data in a data structure.

In some implementations, a method of data extraction includes identifying, by a device, respective sets of unique values for multiple dimensions of a multidimensional data structure; identifying, by the device, a plurality of subsets of permutations of a set of permutations of the unique values; processing, by the device, at least one subset of permutations of the plurality of subsets of permutations, wherein the plurality of subsets of permutations are processed in parallel; obtaining, by the device, based on processing the at least one subset of permutations, respective data associated with each permutation of the at least one subset of permutations, wherein data for a permutation, of the at least one subset of permutations, is obtained based on respective unique values for the permutation that are determined independently of another permutation of the at least one subset of permutations; and storing, by the device, the respective data in a data structure.

In some implementations, a non-transitory computer-readable medium storing a set of instructions for data extraction includes one or more instructions that, when executed by one or more processors of a device, cause the device to: identify respective sets of unique values for multiple dimensions of a multidimensional data structure; identify a plurality of subsets of permutations of a set of permutations of the unique values, wherein the plurality of subsets of permutations are to be processed in parallel; and obtain, based on processing the plurality of subsets of permutations in parallel, respective data associated with each permutation of the plurality of subsets of permutations, wherein data for a permutation, of the plurality of subsets of permutations, is obtained based on respective unique values for the permutation that are determined independently of another permutation of the plurality of subsets of permutations.

DETAILED DESCRIPTION

The following detailed description of example implementations refers to the accompanying drawings. The same reference numbers in different drawings may identify the same or similar elements.

Data extraction involves retrieving data from a data source for further processing, report generation, and/or storage. In some cases, the data from the data source may be organized using a multidimensional data structure, such as a hypercube. That is, the data may be queried using various values for multiple dimensions of the multidimensional data structure. Thus, retrieval of the data may involve iteration through the various permutations of the Cartesian product of the multiple dimensions. This may be accomplished programmatically using multiple nested loops that iterate through the permutations one at a time. However, such a technique results in exponential inflation of data, and increases processing time proportionally with the quantity of permutations, thereby consuming excessive processing and memory resources. Moreover, parallel processing of the data in such cases does not produce significant gains as processing time is reduced only by the degree of parallelism.

A solution to the above technical problems is described herein for extracting data from a multidimensional data structure. In particular, techniques described herein provide direct access for a value of a particular permutation of the multiple dimensions without computing preceding values (computing preceding values is necessary when extracting data using a nested loop technique). In this way, processing time for the data extraction is reduced significantly, thereby conserving processing and memory resources. Moreover, techniques described herein enable parallel processing of subsets of permutations, thereby further reducing processing time.

FIGS. 1A-1D are diagrams of an example 100 associated with data extraction from a multidimensional data structure. As shown in FIGS. 1A-1D, example 100 includes a data extraction platform (e.g., one or more server devices) and a data source (e.g., one or more server devices). These devices are described in more detail in connection with FIGS. 2 and 3. The data source may be associated with an OLAP application (e.g., a business intelligence application). Moreover, the data source may implement a multidimensional data structure (e.g., a multidimensional array of data). In some implementations, the multidimensional data structure is a hypercube (which may also be referred to as an "OLAP cube"). For example, the multidimensional data structure may include multiple dimensions (e.g., two or more dimensions or three or more dimensions). A "dimension" may refer to an index or a category used to organize data. For example, the multidimensional data structure shown has the dimensions Region, Time Period, and Business Unit. As an example, the dimension Region may include (e.g., as members) the values USA, Canada, Mexico, or the like. Other possible dimensions include accounts, departments, line of business, or the like. A dimension may have child dimensions (e.g., child members). For example, the dimension Time Period may include a value of 2020, which may have a child Quarter 1 (Q1), which may have a child January, and so forth.

Figure 1A:
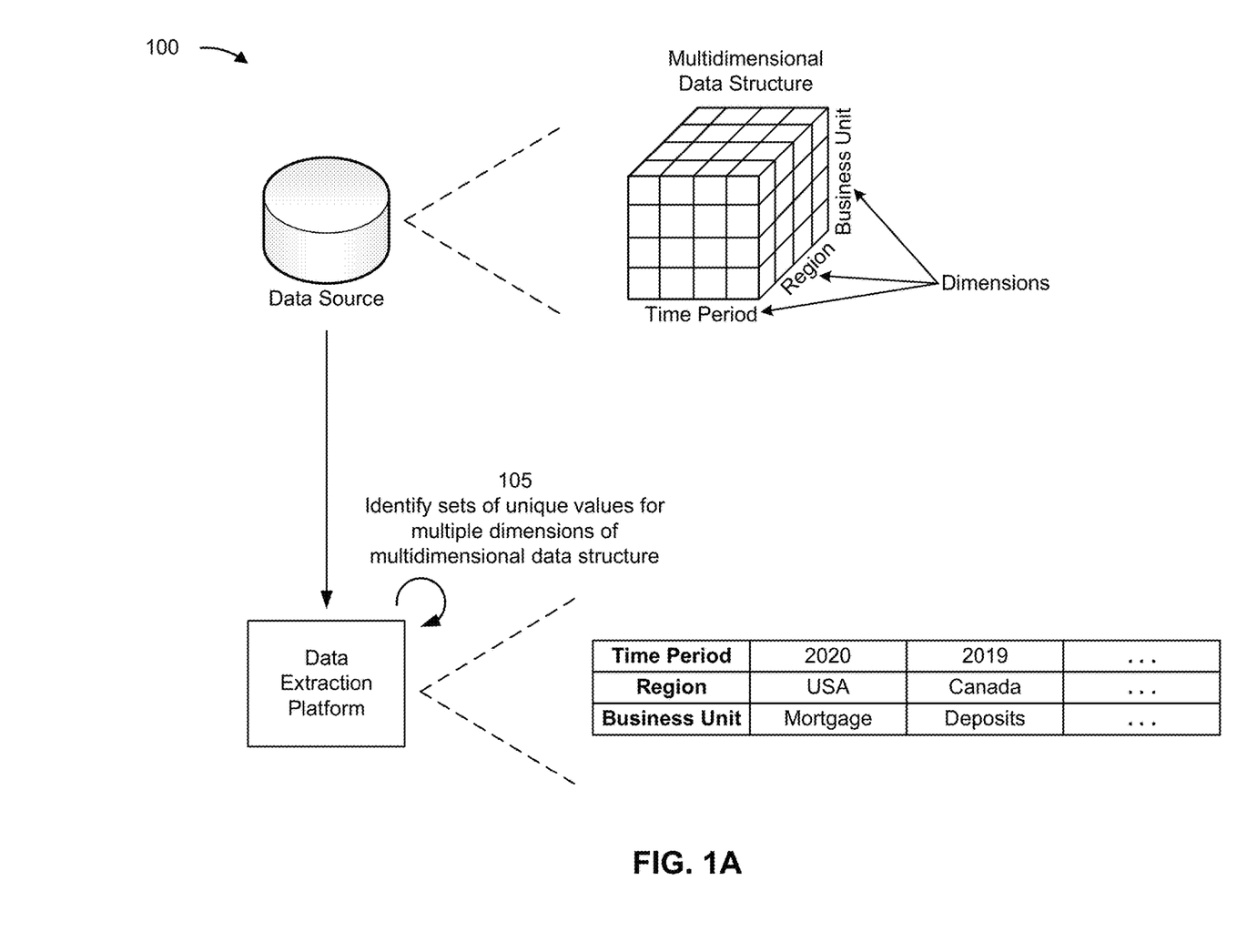
FIGS. 1A-1D are diagrams of an example implementation relating to data extraction from a multidimensional data structure.

The data source may store data in the multidimensional data structure. For example, the intersection of two or more dimensions may point to data (which may also be referred to as a "measure" or a "fact"). The data extraction platform may be used to extract data from the multidimensional data structure, as described herein.

As shown in FIG. 1A, and by reference number 105, the data extraction platform may identify respective sets of unique values for multiple dimensions of the multidimensional data structure. A set of unique values for a dimension may identify the members of the dimension (e.g., which may include children of the top-level members of the dimension). For example, as shown, the set of unique values for the dimension Region may include USA, Canada, and so forth. The data extraction platform may identify the respective sets of unique values for all dimensions of the multidimensional data structure or for multiple dimensions of interest (e.g., less than all dimensions of the multidimensional data structure). The multiple dimensions, for which sets of unique values are identified, may be selected to obtain a particular dataset (e.g., forecast data, actuals data, or the like). For example, the data extraction platform may receive input (e.g., from a user) indicating the multiple dimensions and/or indicating the dataset that is to be extracted.

The data extraction platform may identify a quantity of unique values that are in each set of unique values. Thus, based on identifying the respective sets of unique values, the data extraction platform may determine a quantity of permutations in a set of permutations of the unique values (e.g., by multiplying the respective quantity of unique values for each set of unique values). A permutation may include exactly one unique value from each of the multiple dimensions. For example, a permutation may include a combination of a value of a first set of unique values associated with a first dimension, a value of a second set of unique values associated with a second dimension, a value of a third set of unique values associated with a third dimension, and so forth. As an example, for the dimensions Region, Time Period, and Business Unit, a first permutation may be USA, 2020, Mortgage; a second permutation may be Canada, 2020, Mortgage; a third permutation may be Mexico, 2020, Mortgage; and so forth. The quantity of permutations may indicate an indexing of the permutations of the set of permutations, for example, where a first permutation is associated with an index value of 0, a second permutation is associated with an index value of 1, and so forth up to the quantity of permutations.

In some implementations, to identify the respective sets of unique values, the data extraction platform may transmit a request to a device (e.g., a different device from the data extraction platform) that implements the data source and/or that implements an application associated with the data source. The request may be an application programming interface (API) request to an API implemented by the device. The request may indicate a configuration (e.g., a function, a formula, a query, or the like) for returning the respective sets of unique values for the multiple dimensions. Based on transmitting the request, the data extraction platform may receive a response (e.g., an API response) from the device. The response may indicate the respective sets of unique values for the multiple dimensions. In some implementations, the data extraction platform may perform processing of the respective sets of unique values to remove particular values, reduce a set of unique values to particular values of interest, or the like.

Figure 1B:
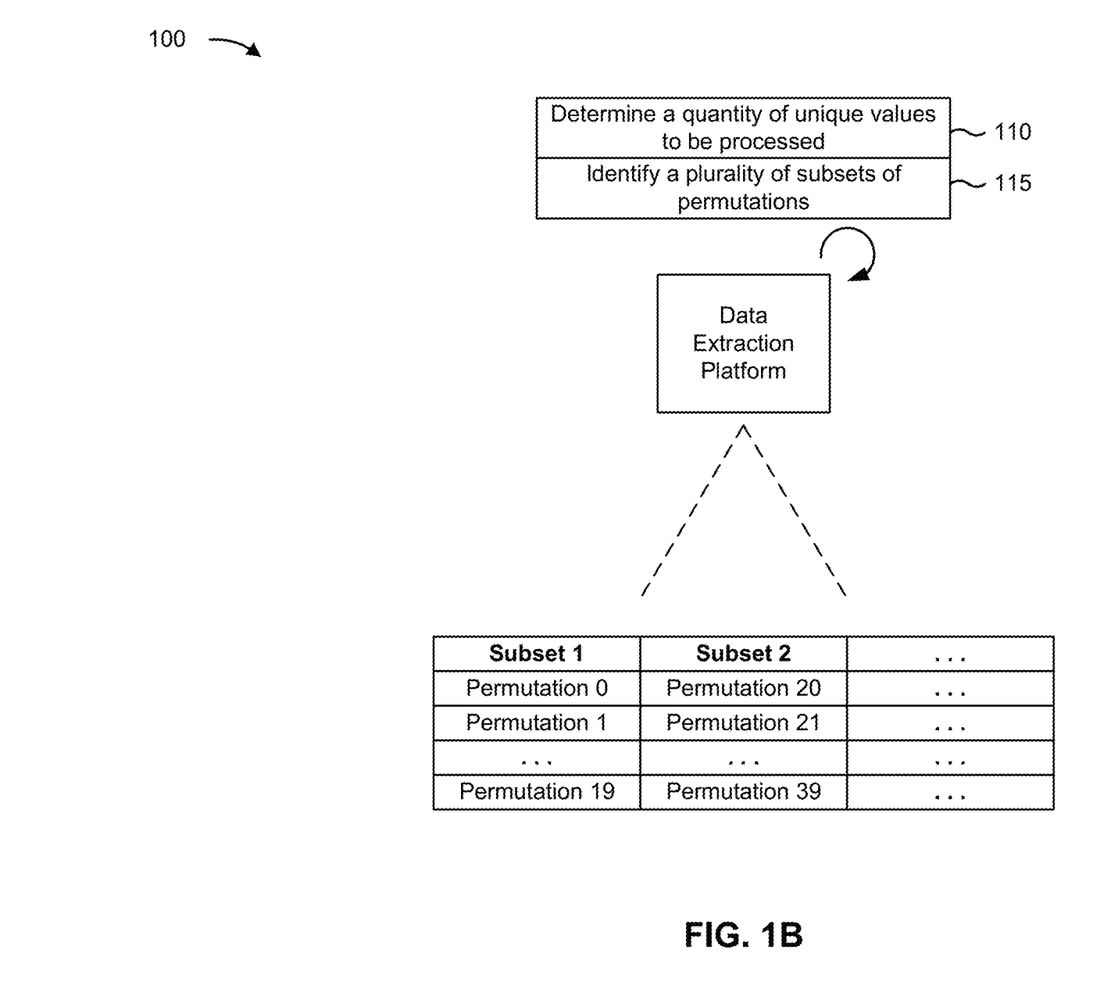

As shown in FIG. 1B, and by reference number 110, the data extraction platform may determine a quantity of unique values that are to be processed (e.g., per processing cycle, per database query, per permutation, or the like). In some implementations, the data extraction platform may receive an input of a setting (e.g., a user setting) for a maximum quantity of unique values that are to be processed. Alternatively, the data extraction platform may be pre-configured with the setting for the maximum quantity of unique values. In some implementations, the data extraction platform may adjust (e.g., reduce or increase) the maximum quantity of unique values (e.g., indicated by the setting) based on a quantity of the multiple dimensions. That is, a maximum quantity of unique values that is indicated (e.g., 25) may be unfeasible for processing in light of the quantity of dimensions (e.g., 10), and thus the data extraction platform may adjust (e.g., reduce) the indicated maximum quantity of unique values to a nearest quantity that is feasible for processing in light of the quantity of dimensions.

As shown by reference number 115, the data extraction platform may identify (e.g., by index value) a plurality of subsets of permutations of the set of permutations. For example, the plurality of subsets of permutations may include respective segments of the set of permutations, and each segment may include consecutive permutations of the set of permutations. Thus, for example, a first subset may include Permutations 0-19, a second subset may include Permutations 20-39, and so forth. Multiple subsets of permutations may be for processing in parallel. That is, each of the multiple subsets of permutations may be processed by a different processor, device, or the like, of the data extraction platform. The data extraction platform may identify a quantity of subsets of permutations that corresponds to a degree of parallelism that is to be used for processing the subsets. As an example, if parallel processing of the subsets is to use five streams, then the data extraction platform may identify five subsets of permutations at a time. In other words, the data extraction platform may identify the five subsets of permutations and process the five subsets of permutations before identifying another five subsets, and so forth.

The data extraction platform may identify a subset of permutations in accordance with a quantity of permutations that are to form a subset of permutations. That is, a subset of permutations identified by the data extraction platform may include the quantity of permutations. The quantity of permutations may correspond to the quantity of unique values determined by the data extraction platform, as described above.

Figure 1C:
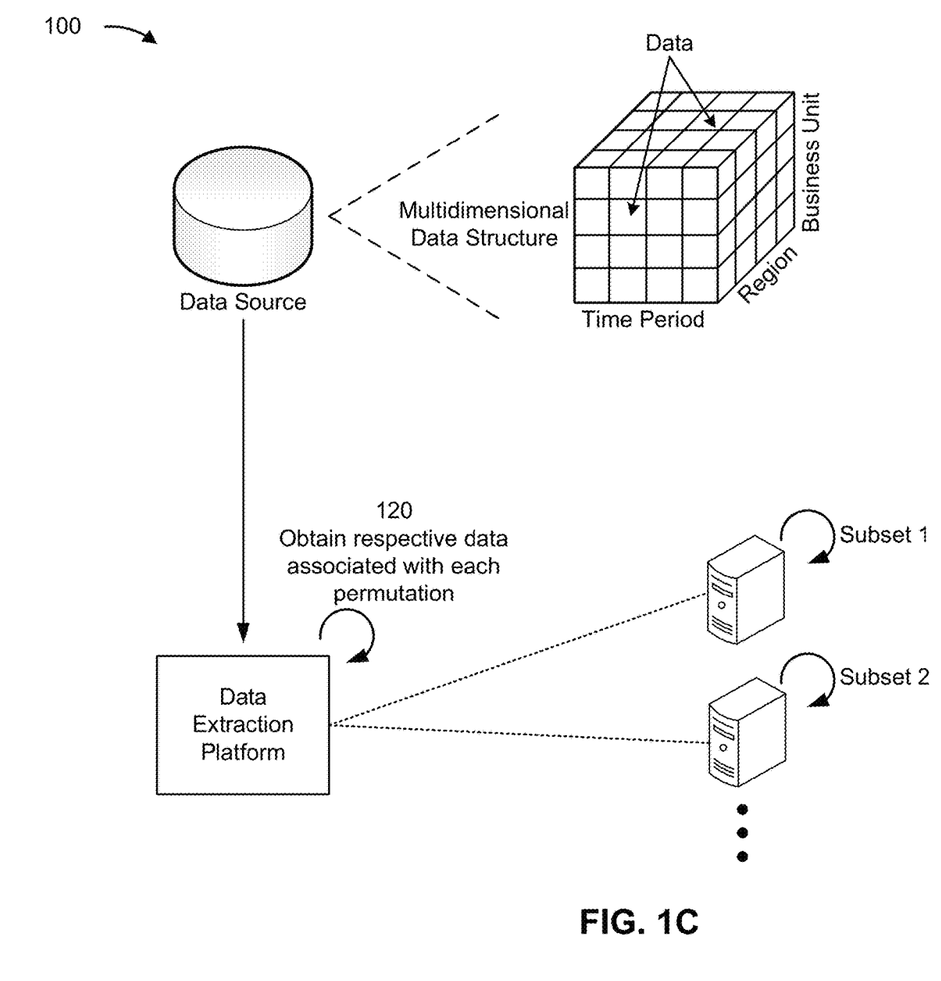

As shown in FIG. 1C, and by reference number 120, the data extraction platform may obtain respective data associated with each permutation of the plurality of subsets of permutations. For example, the data extraction platform may process at least one subset of permutations, and the data extraction platform may obtain the data associated with each permutation, of the subset(s) of permutations, based on processing the subset(s) of permutations. In some implementations, the plurality of subsets of permutations may be processed in parallel. For example, the data extraction platform may process the plurality of subsets of permutations in parallel (e.g., a first processor or device of the data extraction platform may process a first subset, a second processor or device of the data extraction platform may process a second subset, and so forth, simultaneously). As another example, the data extraction platform may process one or more subsets of permutations, while a remainder of the subsets of permutations are processed by another platform or device in parallel with the subset(s) of permutations processed by the data extraction platform.

As described above, a permutation may include respective unique values for the multiple dimensions that define an intersection of the multidimensional data structure, and data for the permutation may be located at the intersection. The data extraction platform may obtain the data for the permutation without regard to a sequence of the permutations. For example, the data extraction platform may obtain the data for the permutation, using the respective unique values for the permutation, without determining values associated with preceding permutations in the sequence of permutations. That is, the respective unique values for the permutation are determined independently of (e.g., without regard to) another permutation in the sequence of permutations. In this way, the data extraction platform conserves processing resources and/or memory resources that may otherwise be used in connection with computing preceding permutations.

In some implementations, the data extraction platform may obtain the data for the permutation based on locations in the multiple dimensions associated with the permutation (e.g., associated with the respective unique values for the permutation). A location in a dimension may identify a unique value of the dimension that is used for the permutation. For example, a location in a first dimension (e.g., Region) may identify a first unique value (e.g., Mexico) forming the permutation, a location in a second dimension (e.g., Time Period) may identify a second unique value (e.g., 2019) forming the permutation, a location in a third dimension (e.g., Business Unit) may identify a third unique value (e.g., Mortgage) forming the permutation, and so forth.

The data extraction platform may determine the locations in the multiple dimensions based on an index of the permutation (e.g., a numeric position of the permutation in the set of permutations) and respective quantities of unique values in the respective sets of unique values for the multiple dimensions. In particular, to determine the locations, the data extraction platform may perform, for each dimension of the multiple dimensions, a modulo operation on the index of the permutation and a quantity of unique values in a set of unique values for the dimension (e.g., permutation index mod quantity of unique values in the dimension). That is, the data extraction platform, using the index of the permutation, may perform a first modulo operation based on a quantity of unique values in a first set of unique values for a first dimension, perform a second modulo operation based on a quantity of unique values in a second set of unique values for a second dimension, and so forth. By doing so, the data extraction platform may obtain respective locations in the multiple dimensions associated with the permutation, as described above. In this way, the data extraction platform may determine the respective unique values of the multiple dimensions used for a particular permutation without determining the respective unique values of the multiple dimensions used for a preceding permutation.

In some implementations, to obtain the data for the permutation, the data extraction platform may transmit information identifying a query based on the permutation (e.g., based on the respective unique values of the multiple dimensions determined for the permutation) to the device that implements the data source and/or that implements the application associated with the data source. The query may be a database query such as a structured query language (SQL) query. In some implementations, a query may be based on a single permutation. For example, the parameters of the query may identify only the unique values of the multiple dimensions determined for the permutation. Alternatively, a query may be based on multiple permutations (e.g., based on all permutations in a subset of permutations). For example, the parameters of the query may identify unique values of the multiple dimensions determined for each of the permutations in a subset of permutations. Based on transmitting the information identifying the query, the data extraction platform may receive a response to the query from the device. The response may indicate the data for the permutation (or for each of the permutations in the subset of permutations).

The data extraction platform may continue obtaining data for the permutations until data is obtained for each permutation of the set of permutations. That is, the data extraction platform may obtain data for the permutations, on a subset-by-subset basis (e.g., using parallel processing) until data is obtained for each permutation of the set of permutations.

In some implementations, the data extraction platform may perform processing of the data (e.g., the respective data for the permutations) to refine the data prior to subsequent use of the data (e.g., prior to storing the data, as described below). In one example of the processing, the data extraction platform may filter the data. The data extraction platform may filter the data based on one or more additional dimensions of the multidimensional data structure (e.g., additional dimensions that were not used to form the permutations). In some cases, the data extraction platform may obtain duplicate data when obtaining the data using parallel processing. Accordingly, in another example of the processing, the data extraction platform may remove the duplicate data from the data.

Figure 1D:
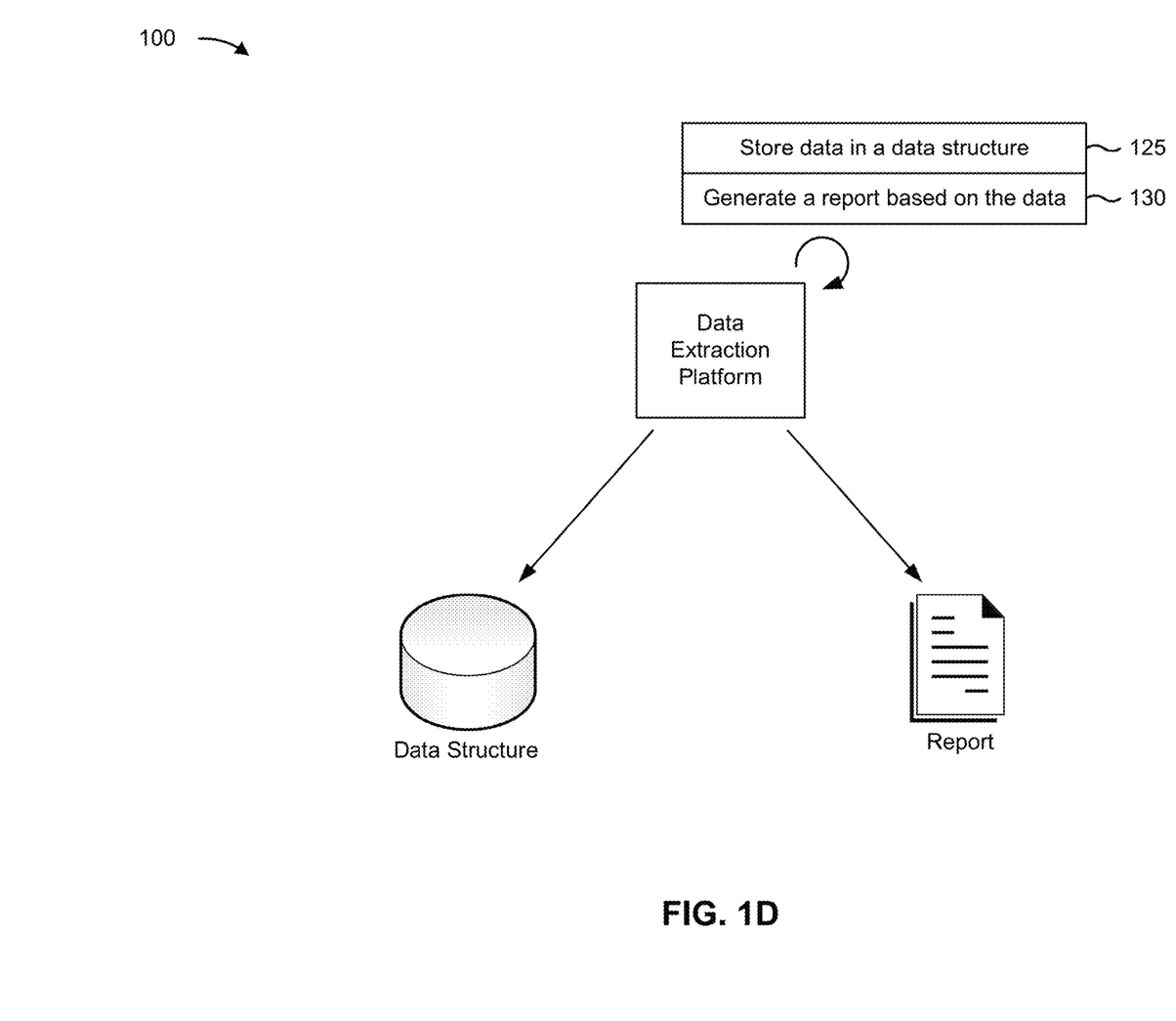

As shown in FIG. 1D, and by reference number 125, the data extraction platform may store the data that is obtained in a data structure. For example, the data extraction platform may store the data in a database, in a file (e.g., a comma-separated values (CSV) file), a data lake, or the like. As shown by reference number 130, the data extraction platform may generate a report based on the data. For example, the data extraction platform may generate a forecast report, an actuals report, or the like, based on the data. In some examples, the data extraction platform may perform additional actions using the data, such as emailing the data, publishing the data on a website, providing the data to a machine learning model for training, or the like.

In this way, the data extraction platform may perform efficient extraction and movement of data. In particular, the data extraction platform may iteratively process the permutations by directly accessing the dimensional values of each permutation and without the use of multiple nested loops. Accordingly, the data extraction platform improves the speed of data extraction and conserves processing resources and/or memory resources.

As indicated above, FIGS. 1A-1D are provided as an example. Other examples may differ from what is described with regard to FIGS. 1A-1D.

Figure 2:
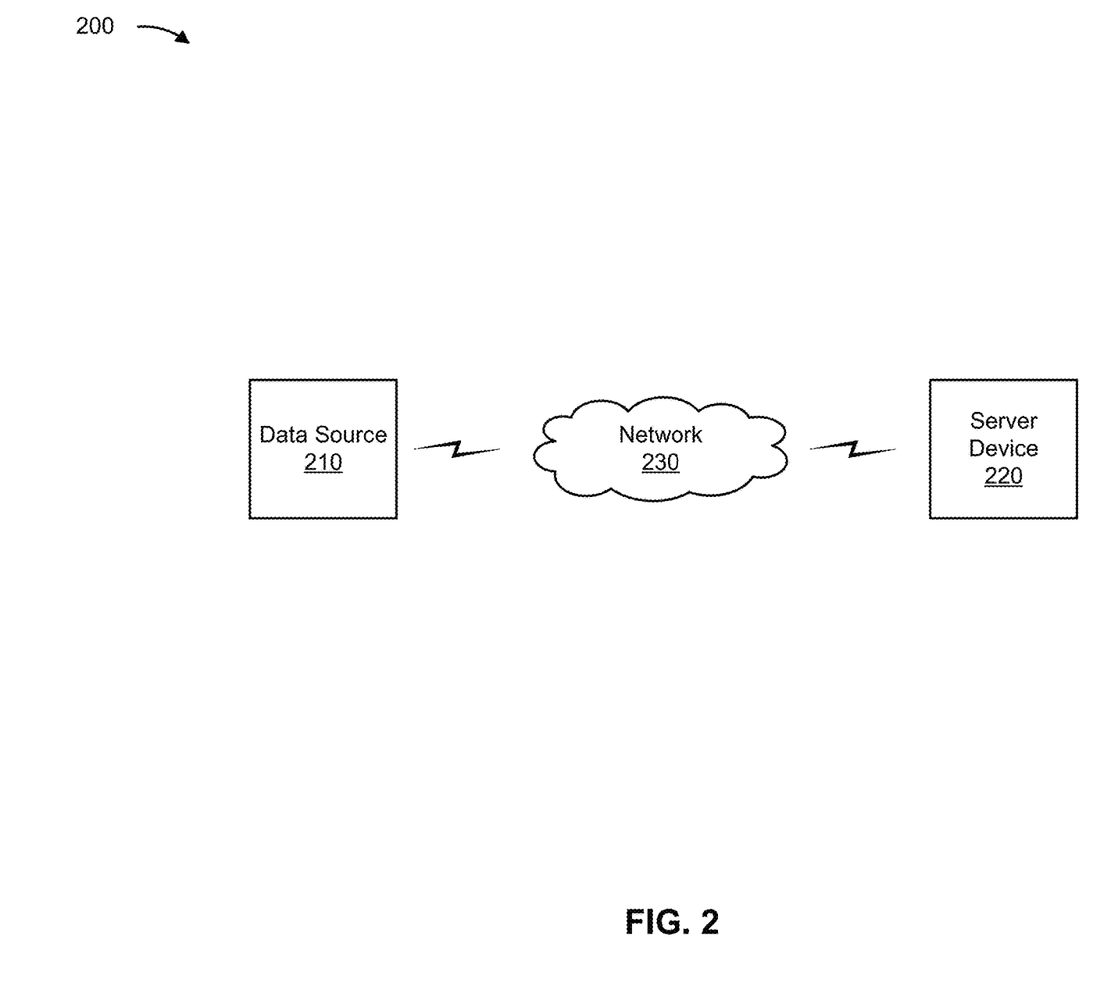
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a data source 210, a server device 220, and a network 230. Devices of environment 200 may interconnect via wired connections, wireless connections, or a combination of wired and wireless connections.

The data source 210 includes one or more devices capable of receiving, generating, storing, processing, and/or providing information associated with a multidimensional data structure, as described elsewhere herein. For example, the data source 210 may implement the multidimensional data structure. The data source 210 may include a communication device and/or a computing device. For example, the data source 210 may include a database, a server, a database server, an application server, a web server, a virtual server (e.g., executing on computing hardware), a server in a cloud computing system, a device that includes computing hardware used in a cloud computing environment, or a similar type of device. The data source 210 may communicate with one or more other devices of environment 200, as described elsewhere herein.

The server device 220 includes one or more devices capable of receiving, generating, storing, processing, providing, and/or routing information associated with data extraction from the data source 210, as described elsewhere herein. The server device 220 may implement the data extraction platform. The server device 220 may include a communication device and/or a computing device. For example, the server device 220 may include a server, such as an application server, a client server, a web server, a host server, a proxy server, a virtual server (e.g., executing on computing hardware), or a server in a cloud computing system. In some implementations, the server device 220 includes computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
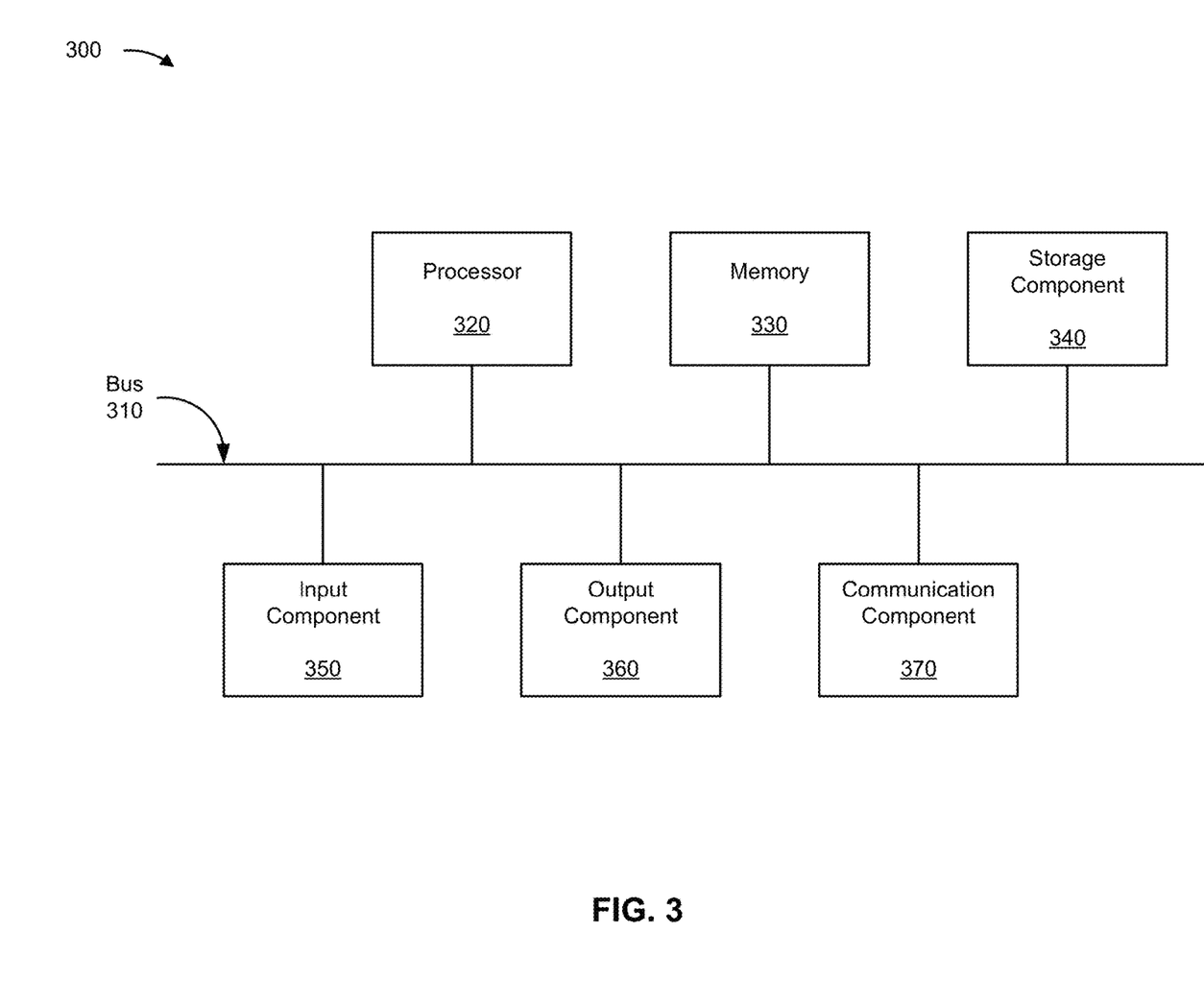
FIG. 3 is a diagram of example components of one or more devices of FIG. 2.

FIG. 3 is a diagram of example components of a device 300, which may correspond to data source 210 and/or server device 220. In some implementations, data source 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
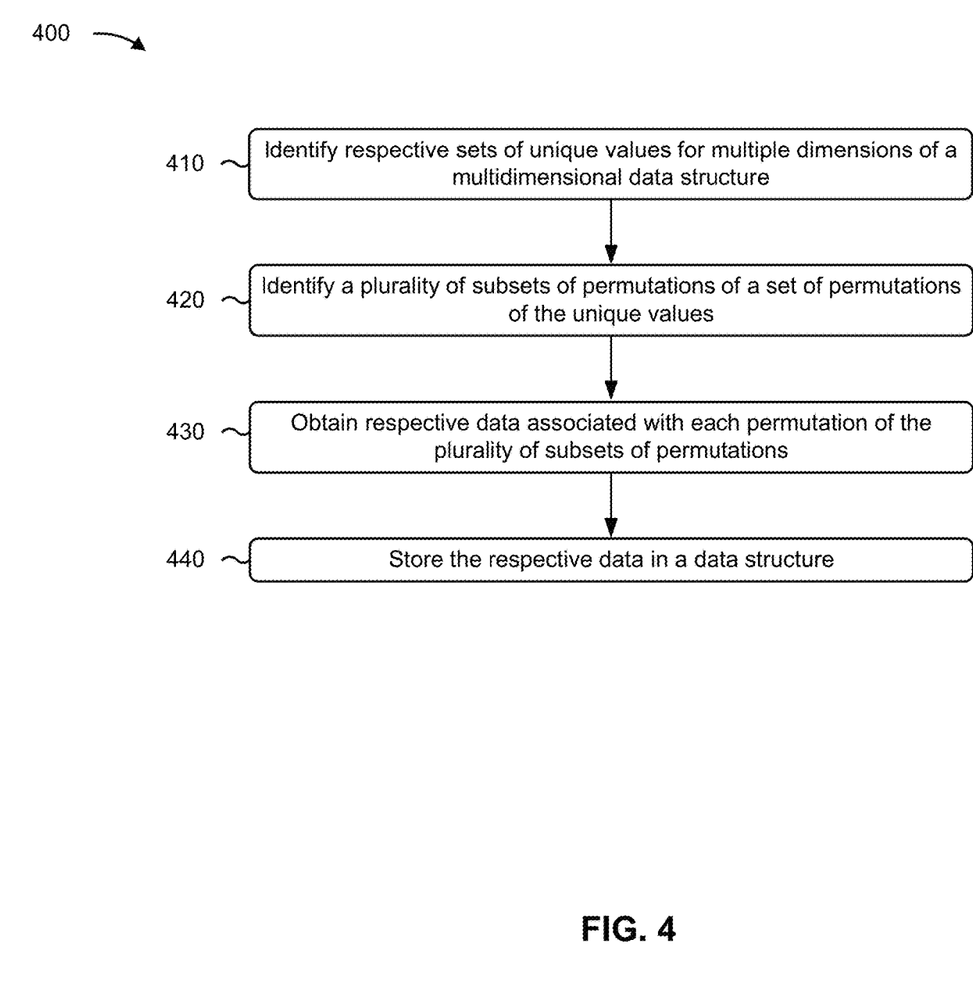
FIG. 4 is a flowchart of an example process relating to data extraction from a multidimensional data structure.

FIG. 4 is a flowchart of an example process 400 associated with data extraction from a multidimensional data structure. In some implementations, one or more process blocks of FIG. 4 may be performed by a device (e.g., server device 220). In some implementations, one or more process blocks of FIG. 4 may be performed by another device or a group of devices separate from or including the device, such as data source 210. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying respective sets of unique values for multiple dimensions of a multidimensional data structure (block 410). As further shown in FIG. 4, process 400 may include identifying a plurality of subsets of permutations of a set of permutations of the unique values (block 420). In some implementations, the plurality of subsets of permutations are to be processed in parallel. As further shown in FIG. 4, process 400 may include obtaining respective data associated with each permutation of the plurality of subsets of permutations (block 430). In some implementations, the respective data is obtained based on processing the plurality of subsets of permutations in parallel. In some implementations, data for a permutation, of the plurality of subsets of permutations, is obtained by performing, for each dimension of the multiple dimensions, a modulo operation on an index of the permutation and a quantity of unique values in a set of unique values for the dimension to obtain respective unique values in the multiple dimensions associated with the permutation. As further shown in FIG. 4, process 400 may include storing the respective data in a data structure (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data extraction, the system comprising:
one or more memories; and
one or more processors, communicatively coupled to the one or more memories, configured to:
identify respective sets of unique values for multiple dimensions of a multidimensional data structure;
identify a plurality of subsets of permutations of a set of permutations of the unique values,
wherein the plurality of subsets of permutations are to be processed in parallel;
obtain, based on processing the plurality of subsets of permutations in parallel, respective data associated with each permutation of the plurality of subsets of permutations,
wherein data for a permutation, of the plurality of subsets of permutations, is obtained by performing, for each dimension of the multiple dimensions, a modulo operation on an index of the permutation and a quantity of unique values in a set of unique values for the dimension to obtain respective unique values in the multiple dimensions associated with the permutation; and
store the respective data in a data structure,
wherein the one or more processors, to obtain the data for the permutation, are configured to:
transmit, to a device, information identifying a query based on the respective unique values, and
receive, from the device, a response to the query that indicates the data.

2. The system of claim 1, wherein a quantity of permutations in a subset of permutations, of the plurality of subsets of permutations, is based on a setting of a maximum quantity of unique values.

3. The system of claim 2, wherein the one or more processors are further configured to:
adjust the maximum quantity of unique values based on a quantity of the multiple dimensions.

4. The system of claim 1, wherein the one or more processors are further configured to:
filter the respective data, prior to storing the respective data, based on one or more additional dimensions of the multidimensional data structure.

5. The system of claim 1, wherein the one or more processors are further configured to:
remove duplicate data from the respective data prior to storing the respective data.

6. The system of claim 1, wherein the one or more processors, to identify the respective sets of the unique values for the multiple dimensions, are configured to:

transmit, to another device, a request that indicates a configuration for returning the respective sets of the unique values; and
receive, from the other device, a response that indicates the respective sets of the unique values.

7. The system of claim 1, wherein the device implements a data source that implements the multidimensional data structure or implements an application associated with the data source.

8. A method of data extraction, comprising:
identifying, by a device, respective sets of unique values for multiple dimensions of a multidimensional data structure;
identifying, by the device, a plurality of subsets of permutations of a set of permutations of the unique values;
processing, by the device, at least one subset of permutations of the plurality of subsets of permutations,
wherein the plurality of subsets of permutations are processed in parallel;
obtaining, by the device, based on processing the at least one subset of permutations, respective data associated with each permutation of the at least one subset of permutations,
wherein data for a permutation, of the at least one subset of permutations, is obtained based on respective unique values for the permutation that are determined independently of another permutation of the at least one subset of permutations, and
wherein obtaining the data for the permutation comprises:
transmitting, to a different device, information identifying a query based on the respective unique values, and
receiving, from the different device, a response to the query that indicates the data; and
storing, by the device, the respective data in a data structure.

9. The method of claim 8, wherein obtaining the data for the permutation comprises:
determining locations in the multiple dimensions associated with the permutation based on an index of the permutation and respective quantities of unique values in the respective sets of unique values for the multiple dimensions; and
obtaining the data for the permutation based on the locations.

10. The method of claim 9, wherein determining the locations in the multiple dimensions comprises:
performing, for each dimension of the multiple dimensions, a modulo operation on the index of the permutation and a quantity of unique values in a set of unique values for the dimension to obtain a location in the dimension associated with the permutation.

11. The method of claim 8, wherein a quantity of permutations in the at least one subset of permutations is based on a setting of a maximum quantity of unique values.

12. The method of claim 11, further comprising:
adjusting the maximum quantity of unique values based on a quantity of the multiple dimensions.

13. The method of claim 8, wherein identifying the respective sets of the unique values for the multiple dimensions comprises:
transmitting, to another device, a request that indicates a configuration for returning the respective sets of the unique values; and
receiving, from the other device, a response that indicates the respective sets of the unique values.

14. The method of claim 8, wherein parameters of the query identify the respective unique values.

15. A non-transitory computer-readable medium storing a set of instructions for data extraction, the set of instructions comprising:
one or more instructions that, when executed by one or more processors of a device, cause the device to:
identify respective sets of unique values for multiple dimensions of a multidimensional data structure,
wherein the one or more instructions, that cause the one or more processors to identify the respective sets of the unique values for the multiple dimensions, cause the one or more processors to:
transmit, to another device, a request that indicates a configuration for returning the respective sets of the unique values, and
receive, from the other device, a response that indicates the respective sets of the unique values;
identify a plurality of subsets of permutations of a set of permutations of the unique values,
wherein the plurality of subsets of permutations are to be processed in parallel; and
obtain, based on processing the plurality of subsets of permutations in parallel, respective data associated with each permutation of the plurality of subsets of permutations,
wherein data for a permutation, of the plurality of subsets of permutations, is obtained based on respective unique values for the permutation that are determined independently of another permutation of the plurality of subsets of permutations.

16. The non-transitory computer-readable medium of claim 15, wherein the one or more instructions, that cause the device to obtain the data for the permutation, cause the device to:
determine locations in the multiple dimensions associated with the permutation based on an index of the permutation and respective quantities of unique values in the respective sets of unique values for the multiple dimensions; and
obtain the data for the permutation based on the locations.

17. The non-transitory computer-readable medium of claim 16, wherein the one or more instructions, that cause the device to determine the locations in the multiple dimensions, cause the device to:
perform, for each dimension of the multiple dimensions, a modulo operation on the index of the permutation and a quantity of unique values in a set of unique values for the dimension to obtain a location in the dimension associated with the permutation.

18. The non-transitory computer-readable medium of claim 15, wherein the one or more instructions, when executed by the one or more processors, further cause the device to:
store the respective data in a data structure.

19. The non-transitory computer-readable medium of claim 15, wherein the one or more instructions, when executed by the one or more processors, further cause the device to:
generate a report based on the respective data.

20. The non-transitory computer-readable medium of claim 15, wherein the multidimensional data structure is a hypercube.

* * * * *